B. GRENCI.
FLUID PIPE COUPLING.
APPLICATION FILED JULY 3, 1919.
1,343,819.
Patented June 15, 1920.
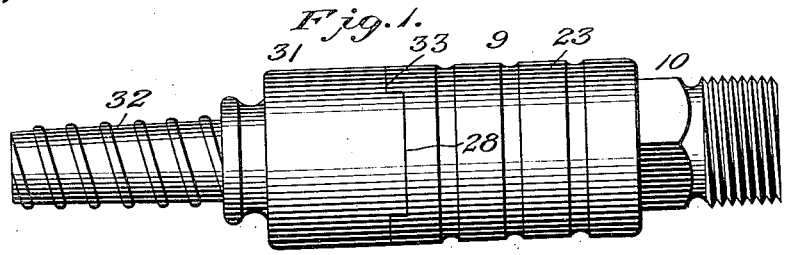
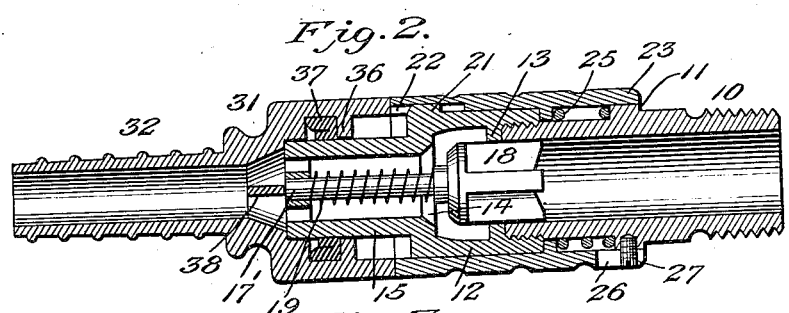
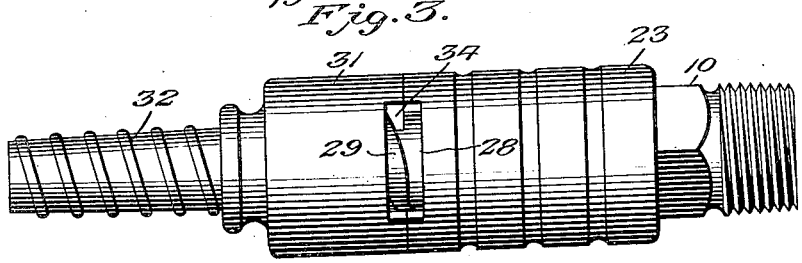
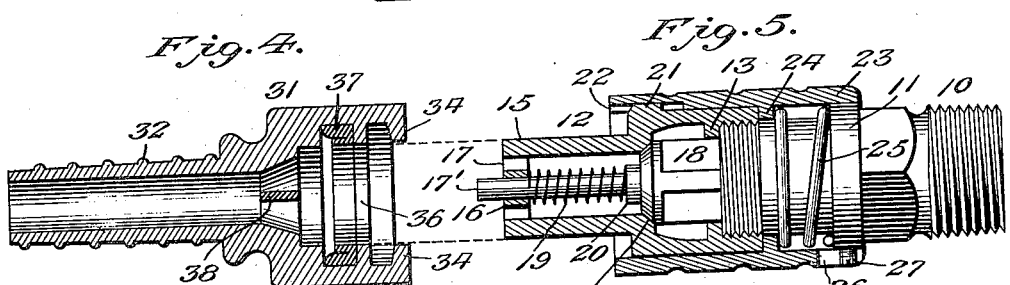
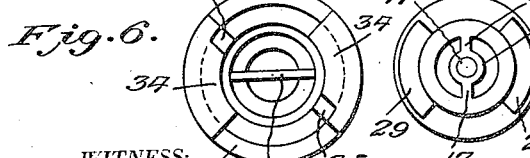
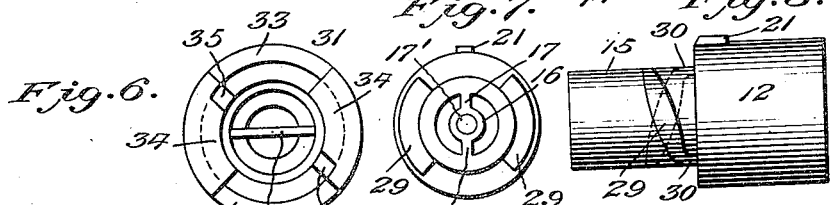
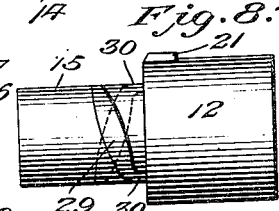
WITNESS:
Edwin F. McKee
INVENTOR.
By Bruno Grenci
Victor J. Evans
ATTORNEY.

UNITED STATES PATENT OFFICE.

BRUNO GRENCI, OF CLIFTON CITY, NEW JERSEY.

FLUID-PIPE COUPLING.

1,343,819.  Specification of Letters Patent.  Patented June 15, 1920.

Application filed July 3, 1919. Serial No. 308,462.

*To all whom it may concern:*

Be it known that I, BRUNO GRENCI, a subject of the King of Italy, residing at Clifton City, in the State of New Jersey, have invented new and useful Improvements in Fluid-Pipe Couplings, of which the following is a specification.

This invention has reference to an improved coupling for fluid pipes.
The primary object of the invention is to produce a coupling of this character wherein the valve is at all times under the control of the operator, the coupling being preferably in the nature of a handle member being connected directly to or in close relation with respect to the tool operated by the fluid.

A further object of the invention is to produce a coupling for fluid pipes in which there is arranged a valve that is normally seated by fluid pressure, one of the elements of the coupling being in the nature of a rotatable and removable member, the said member controlling the valve so that when the member is brought to one position the valve will be seated and when brought to another position the valve will be unseated, means being provided for locking the said member to the remainder of the coupling when the same is turned to valve unseating position.

It is a still further object of the invention to produce a coupling for this purpose which shall be of a comparatively simple construction, cheap to manufacture and market, and one which will perform the functions for which it is devised with accuracy and with certainty.

The foregoing objects, and others which will appear as the nature of the invention is better understood, may be accomplished by a simple construction, combination and operative arrangement of parts, such as illustrated by the accompanying drawings and pointed out in the appended claims.
In the drawings:

Figure 1 is a side elevation of my improved coupling.

Fig. 2 is a central longitudinal sectional view through the same.
Fig. 3 is an elevation showing the valve control member of the coupling turned to permit the seating of the valve by fluid pressure.

Fig. 4 is a central longitudinal sectional view through the valve control member.

Fig. 5 is a sectional view through the remainder of the coupling.

Fig. 6 is an end elevation looking toward the head portion of the valve control member.

Fig. 7 is an end view of the valve carrying plug.

Fig. 8 is a side elevation thereof.

The improved coupling for fluid conducting pipes is broadly indicated by the numeral 9.

The coupling has at one of its ends a fluid intake member which is in the nature of a short pipe section and which has both of its ends provided with exterior threads. This pipe member is indicated by the character 10 and is provided, approximately centrally with an outstanding annular rib 11.

The valve carrying plug, indicated by the numeral 12, has one of its ends enlarged and provided, in its bore with interior threads that are engaged by the inner threads on the member 10. The valve plug 12, at its referred to enlarged end, and at the terminal of the referred to threads is provided with an inwardly extending annular flange 13, while the inner wall provided at the juncture of the enlarged and reduced portions of the valve plug is beveled inwardly to provide a valve seat 14. The reduced barrel extension 15 of the plug, at the outer end thereof is centrally provided with a ring-like guide 16, connected by oppositely disposed web portions 17 to the wall of the bore of the barrel. The portion 16 provides a guide for the stem 17' of a slidable valve 18. The active face of the valve is beveled so that the same will snugly engage with the seat 14, the ribbed body portion of the valve being guided through the flange 13. The valve 18 is normally retained unseated by a comparatively light spring 19 that exerts a pressure between the guide 16 and a lug 20 that is formed on the inner face of the valve.

The valve carrying member or plug 12 has its enlarged portion or body proper upon its outer surface formed with or provided with a key 21 that is designed to be received in the key slot 22 in the bore of a sleeve 23. This permits a limited longitudinal movement of the sleeve 23 over the enlarged end of the plug 12 and over the fluid inlet member 10. By reference to the drawings, it will be seen that the sleeve 23 is of a length to be snugly received on the rib 11 of the member 10 and also that the said sleeve is provided with an interior annular flange 24 that rests on the inner portion of the pipe member 10. In the space between the flange 24 of the sleeve and the rib 11 of the member 10 there is arranged a comparatively strong helical spring 25 which exerting a pressure between the rib and flange moves the sleeve 23 longitudinally in a direction outward of the member 10, such movement being halted by contact of the flange 24 with the inner end of the plug 12.

The key 21, engaging in the key slot 22 will under ordinary conditions hold the sleeve against rotary movement, but as the plug 12 is threadedly connected to the fluid inlet member 10 additional means are needed for holding the sleeve against such rotary movement which would tend to uncouple the plug from the said member 10. To accomplish this I notch what I will term the inner end of the sleeve at the portion thereof that overlies the rib 11. This notch is indicated by the numeral 26, and passing through the notch and engaging a threaded orifice in the member 10 is a headless screw 27.

The outer end of the sleeve 23 is pitched and is, at diametrically opposed points notched as at 28. The inner walls of the notches 28 are also pitched or arranged at an angle. The barrel 15 of the plug 12, in a line with the notches 28 is provided, on its outer surface with cam members that are pitched at opposite angles and that provide threads 29. These thread sections are of a length approximately equaling the distance between the ends of the notches 28, and each of the said sections, upon its inclined end nearest the shoulder provided between the barrel and the enlarged end of the plug 12, has an inwardly extending portion 30 that are designed to serve as stops for the combined coupling head and valve control member which will now be described.

The combined coupling head and valve control comprises a member provided with an annular head portion 31 that has at its outer end a reduced longitudinally extending nipple 32, and to this nipple the flexible hose for the tool is designed to be attached. The head portion 31 has its open end arranged at a pitch or angle, and the said end is provided with diametrically opposed notches 33. The portions 34 between the notches 33 are widened inwardly, having, of course, their inner edges concaved and these portions 34 provide cam thread members that are designed to co-engage with the sectional cam thread members 29 on the barrel of the valve plug.

While I have stated that the thread sections 29 are approximately of a length corresponding with that of the notches 28 in the sleeve, preferably the inner and lower walls thereof provided with the stops 30 are arranged in a line with one of the end walls of the notches 28 and the other end of the said thread portions project a slight distance beyond the other end wall of the notches. Therefore, I notch, as at 35 the opposite and inner ends of the threads 34 on the member 31 so that when the member 31 is to be attached to the valve plug the inner walls of these notches 35 will contact with the outer walls of the stops 30, and in this manner sustain the member 20 in a position away from influencing the valve to unseat the same. The arrangement also permits of the proper co-engagement of the thread sections when the member 31 is turned to cause its thread to ride over the threads 29 and to permit of the threads of the said member 31 being received in the notches 28. To uncouple the member 31 or to bring the same out of valve influencing position a slight pressure is exerted longitudinally on the sleeve 23 against the pressure of the spring 25.

The bore of the head portion of the member 31 is provided with an inwardly extending flange or rib 36, and seated between this rib and the inner wall of said head portion is a compressible gasket 37 which frictionally contacts with the barrel 15 of the valve plug 12 to prevent a leakage of the fluid between the member 31 and the said barrel.

The member 31 has its bore flared outwardly from the nipple 32 to the head portion of the said member, and in this flared portion of the bore is a transversely arranged bridge piece 38 which is in the path of contact with the end of the valve stem 17' so that when the member 31 is screwed home on the barrel of the valve plug and its threads received in the notches 28 of the sleeve 23 the valve is unseated and a free passage of fluid is permitted through the coupling.

It is thought from the foregoing description, when taken in connection with the drawings, the simplicity of the construction and the advantages thereof will be readily apparent without further detailed description.

Having thus described the invention, what is claimed as new, is:—

1. In a fluid coupler, a fluid inlet member, a longitudinally movable valve associated therewith, a spring influenced sleeve arranged over said member, a combined coupling head and valve control member for contacting engagement with the sleeve, interengaging means between the member and the sleeve when the said member is brought to one position, interlocking means between the member and the remainder of the coupler when the same is brought to its last mentioned position, and means carried by the said member for unseating the valve when in its last mentioned position.

2. In a fluid pipe coupler, a fluid inlet member, a hollow valve plug carried thereby, a slidable valve in the plug, a spring influenced sleeve arranged over the plug and the fluid inlet member, a combined coupling head and valve control member arranged over the plug and contacting with the sleeve, means, comprising threads between the plug and member for locking the latter in one position when the same has been brought to unseat the valve, and interengaging locking means between the member and sleeve when the said member is in its last mentioned position.

3. In a coupler for the purpose set forth, a fluid inlet member, a hollow valve plug carried thereby, a spring influenced sleeve arranged over one end of the plug and one end of the fluid inlet member, means for retaining the sleeve against independent rotary movement with respect to the member and plug, said sleeve having one of its ends notched and arranged at an inclination, the plug, inward of the notches having oppositely pitched cam thread portions which have one of their ends shouldered, a combined coupling head and valve control member, the head portion of which having its end pitched, provided with oppositely opposed notches and with widened portions between the notches which form cam threads and which are designed to coengage with the threads of the plug and to be received in the notches of the sleeve when turned to one position, and a bridge piece in the said head designed to contact with the stem of the valve to unseat the latter when the head is in its last mentioned position.

4. In a coupler for the purpose set forth, a fluid inlet member, a spring influenced sleeve slidable thereon, means for limiting the longitudinal movement of the sleeve, means for holding the sleeve against rotary movement independent of the fluid inlet member, a hollow valve plug removably secured to the fluid inlet member and having a reduced barrel portion projected outward of the sleeve, guide means between the plug and sleeve, a longitudinally movable valve seated in the plug having a stem guided through the outer end of the barrel, spring means for normally unseating the valve and said valve designed to be seated by fluid pressure, the outer end of the sleeve being arranged at an inclination and having oppositely disposed notches, the inner walls of which being also inclined, the barrel in a line with the notches having cam shaped thread sections which terminate with one of their ends in shoulders, a combined coupling head and valve control having a nipple at one of its ends and its other end arranged at an inclination, provided with spaced notches and the portions thereof between the notches being widened inwardly, said last mentioned portions having their inner faces oppositely beveled and providing thread sections designed to coengage with the thread sections on the plug and when brought in contact with the stops at the ends of said last mentioned sections to be arranged in a line with and to be seated in the notches of the spring influenced sleeve, a bridge piece in the said member for contacting with the stem of the valve to unseat the latter when the said member is in its last mentioned position, and a compressible gasket between the said member and the barrel of the plug.

In testimony whereof I affix my signature.

BRUNO GRENCI.